United States Patent [19]
Naganawa et al.

[11] Patent Number: 5,861,458
[45] Date of Patent: Jan. 19, 1999

[54] SILICONE WATER-BASED EMULSION MOLD RELEASE AGENT AND A MANUFACTURING METHOD THEREFOR

[75] Inventors: Tsutomu Naganawa; Hiroki Ishikawa; Isao Ona, all of Chiba Prefecture, Japan

[73] Assignee: Dow Corning Toray Silicone Co., LTD., Tokyo, Japan

[21] Appl. No.: 703,574

[22] Filed: Jul. 1, 1996

[30] Foreign Application Priority Data

Jun. 30, 1995  [JP]  Japan .................................. 7-187728

[51] Int. Cl.⁶ ........................................................ C08L 83/00
[52] U.S. Cl. .......................... 524/837; 525/474; 525/478; 528/15
[58] Field of Search ..................................... 525/474, 478; 524/837; 528/15

[56] References Cited

U.S. PATENT DOCUMENTS 5,462,988  10/1995  Doi et al. ................................ 524/837
5,624,997   4/1997  Liles et al. ............................. 524/837

*Primary Examiner*—Melvyn I. Marquis
*Attorney, Agent, or Firm*—Robert L. McKellar

[57] ABSTRACT

What is discussed herein is a silicone water-based emulsion mold release agent characterized by the fact that its principal ingredient is the condensation reaction product of a diorganopolysiloxane having the general formula

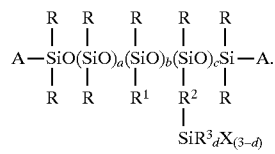

5 Claims, No Drawings

SILICONE WATER-BASED EMULSION MOLD RELEASE AGENT AND A MANUFACTURING METHOD THEREFOR

INDUSTRIAL APPLICATION FIELD

This invention pertains to a type of silicone water-based emulsion mold release agent and its manufacturing method. More specifically, this invention pertains to a type of silicone water-based emulsion mold release agent, which can form a mold release film with excellent paintability.

Prior art silicone water-based emulsions that can form mold release films with excellent paintability are the emulsions prepared by emulsification of diorganopolysiloxanes which have long-chain alkyl groups bonded to silicon atoms. This is carried out in water using a surfactant. See Japanese Kokai Patent Application Nos. Hei 4, 1992-84643, Hei 5,1993-177294, and Hei 5, 1993-287204. These emulsions are widely used as the mold release agents for plastic and aluminum moldings, which have to be coated or printed with organic paint, inks and the like after molding to form the products. However, for these emulsions, the viscosity of diorganopolysiloxane containing long-chain alkyl groups as the principal ingredient is at most about 1,000 cP at 25° C. Consequently, it is prone to flow and drip downward when it is coated on a mold, so that a sufficient mold release property cannot be realized. This is a disadvantage.

The diorganopolysiloxane containing long-chain alkyl groups used in preparing the emulsions is usually prepared by the addition reaction of α-methylstyrene or C10–14 α-olefins and methyl hydrogen having its ends blocked by trimethylsiloxy groups, in the presence of a platinum metal catalyst. However, the degree of polymerization of the methylhydrogensiloxanes used in this reaction is at most only about 50. Consequently, it is very difficult to form diorganopolysiloxanes containing long-chain alkyl groups with a high viscosity. To solve this problem, the following methods have been proposed: a method in which the degree of polymerization of siloxane as the starting material is increased by performing copolymerization of dimethylcyclosiloxane and methylhydrogencyclosiloxane with methyl hydrogensiloxane and a method in which the long-chain alkyl group is extended by having about 20 carbon atoms for the α-olefin. However, in the former method, the paintability deteriorates. In the latter method, as the content of silicone decreases, the mold release property and heat resistance deteriorate, and the silicone oil prone to coagulate at room temperature. These are disadvantages. Problems to be solved by the invention To solve the aforementioned problems, the present inventors have performed extensive research. As a result of this research, this invention was reached.

The purpose of this invention is to provide a type of silicone water-based emulsion mold release agent which can form a mold release film with excellent paintability and which essentially does not flow and drip downward when it is coated on various types of substrates. This invention also provides a manufacturing method for this type of mold release agent.

Means to Solve the Problems

This invention provides a silicone water-based emulsion mold release agent characterized by the fact that its principal ingredient is the condensation reaction product of diorganopolysiloxanes represented by general formula:

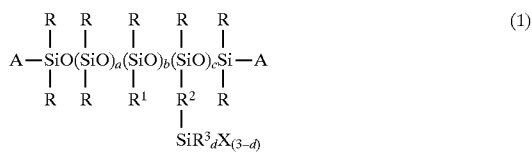

in which R represents a monovalent hydrocarbon group of 1 to 7 Carbon atoms; $R^1$ represents a monovalent hydrocarbon group having eight or more carbons; $R^2$ represents a divalent hydrocarbon group having 1 to 4 carbon atoms; $R^3$ represents a monovalent hydrocarbon group or a hydroxy group; X represents a hydrolyzable group; A represents a group selected from R, $R^1$, and the group represented by the formula:

$$-R^2-SiR^3_dX_{(3-d)}$$

in which $R^2$, $R^3$ and X have the same meanings as set forth above and d has a value of 0, 1, or 2, with the proviso that when c is 0, at least one A is a group represented by the formula:

$$-R^2-SiR^3_dX_{(3-d)};$$

a has a value of 0 or a positive integer; b is a positive integer; c has a value of 0 or a positive integer; with a/(a+b+c)=0 to 0.2 and c/(a+b+c)=0 to 0.2, and d has a value of 0, 1, or 2.

This invention also provides a manufacturing method for the aforementioned silicone water-based emulsion mold release agent.

The mold release agent of this invention is an emulsion prepared by homogeneously emulsifying and dispersing the condensation reaction product of diorganopolysiloxanes represented by said general formula (1), in water. In the aforementioned formula, R represents a C1–7 monovalent hydrocarbon group, such as methyl, ethyl, propyl, pentyl, heptyl, or other alkyl group; phenyl, tolyl, or other aryl group; or cyclopentyl, methylcyclopentyl, cyclohexyl, cycloheptyl, or other cycloalkyl group. The R groups may be the same or different. It is preferred that at least 50 mol % of the R groups be methyl groups from the viewpoint of the mold release property. $R^1$ represents a C8 or higher monovalent hydrocarbon group, such as octyl, nonyl, decyl, undecyl, dodecyl, or other alkyl group; ethylphenyl, propylphenyl, butylphenyl, or other aryl group; or phenylethyl, phenylpropyl, phenylbutyl, or other aralkyl group. The $R^1$ groups may be the same or different. $R^2$ represents a divalent hydrocarbon group, such as ethylene, n-propylene, isopropylene, or isobutylene. $R^3$ represents a monovalent hydrocarbon group or hydroxy group. Examples of the monovalent hydrocarbon group include methyl, ethyl, propyl, or other alkyl group; or phenyl, tolyl, xylyl, or other aryl groups. The designation X represents a hydrolyzable group, such as alkoxy, ketoxime, aminoxy, alkenyloxime, amino, amido, halogen, and the like. Among them, the alkoxy group is preferred. The designation A represents a group selected from R, $R^1$, and a group represented by formula $$-R^2-SiR^3_dX_{(3-d)};$$

in which $R^2$, $R^3$, and X have the same meanings as above and d is 0, 1, or 2, with the proviso that when c is 0, at least one A is a group represented by $-R^2-SiR^3_dX_{(3-d)}$. This is for forming a high-viscosity organopolysiloxane by a condensation reaction of the hydrolyzable groups, and silanol groups the group represented by the formula $-R^2-SiR^3_dX_{(3-d)}$.

Examples include trimethoxysilylethyl group, triethoxysilylethyl group, methyldimethoxysilylethyl group, and tri(methylethylketoxime)silylethyl group. The designation a is 0 or a positive integer; b is a positive integer; c is 0 or a positive integer, with $a/(a+b+c)=0$ to 0.2 and $c/(a+b+c)=0$ to 0.2, and d is 0, 1, or 2. This is because if $a/(a+b+c)$ or $c/(a+b+c)$ is larger than 0.2, the paintability deteriorates. There is no special limitation on the upper limit of $(a+b+c)$. However, it is preferred that the value be appropriate to ensure a viscosity that allows emulsification of said diorganopolysiloxane by a machine. It is more preferred that the value be smaller than 100.

The diorganopolysiloxane represented by the general formula (1) may be manufactured, for example, by addition reaction of an organic silicon compound containing hydrolyzable groups represented by the following formulae:

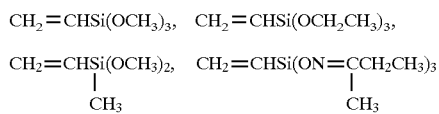

to methyl hydrogen polysiloxane or dimethylsiloxane-methyl hydrogen siloxane copolymer in the presence of chloroplatinic acid or other hydrosilylating reaction catalyst, followed by addition reaction of α-olefin, styrene or α-methylstyrene, such as those represented by the following formulae: $CH_2=CH(CH_2)_7CH_3$, $CH_2=CH(CH_2)_9CH_3$, and $CH_2=CH(CH_2)_{11}CH_3$.

Also, it is possible to introduce hydrolyzable groups by means of dehydrochlorination using methanol, methyl ethyl ketoxime, and the like, after the addition reaction of halogenosilane, such as that represented by the formula $CH_2=CHSiCl_3$, to the hydrogen atoms bonded to the silicon in methylhydrogen polysiloxane.

The following are examples of diorganopolysiloxane of the aforementioned type.

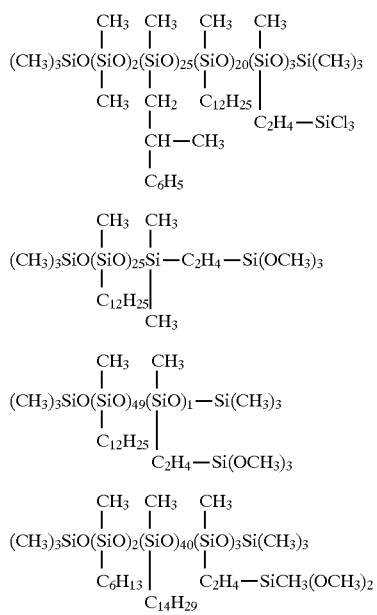

-continued

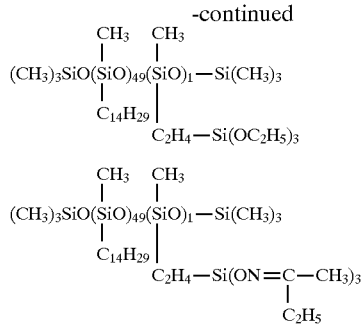

The mold release agent of this invention is a water-based emulsion with its principal ingredient being the condensation reaction product of the diorganopolysiloxane represented by the general formula (1). However, in addition to the aforementioned condensation reaction product, it is also possible to add other types of diorganopolysiloxane, such as diorganopolysiloxanes free of the group represented by the general formula (1): $—R^2—SiR^{3d}X_{(3-d)}$.

As the principal ingredient of the mold release agent of this invention, the diorganopolysiloxane represented by the general formula (1) should have a viscosity at 25° C. as high as 2,000 Cst or higher, preferably 3,000 Cst or higher.

As an example of the manufacturing method of the mold release agent of this invention, the diorganopolysiloxane represented by said general formula (1) is emulsified using the conventional method by means of emulsifying equipment, such as homomixer, colloid mill, line mixer, homogenizer, and the like; then, the emulsion is allowed to sit at room temperature or at about 50° C. for a period of 1 day to 6 months, so that the condensation reaction can take place in the emulsion micelles.

In another method, while the condensation reaction is performed for said diorganopolysiloxane, emulsification is carried out using the aforementioned method by means of the aforementioned emulsifying equipment. As a scheme of the latter method, for example, during emulsification, heating is performed, or an ingredient that can promote the condensation reaction is added so as to carry out the condensation reaction, while emulsification is taking place. After emulsification, the emulsion is allowed to sit for a period of 1 day to 3 months. In addition to these methods, there are also other methods, such as the method in which the aforementioned diorganopolysiloxane is subjected to condensation reaction beforehand to form a high-viscosity condensation reaction product, followed by emulsification using the conventional method by means of the aforementioned conventional emulsifying equipment. In this case, it is preferred that the viscosity of the condensation reaction product be within an appropriate range to enable emulsification by a machine. When the condensation reaction is performed before emulsification, it is preferred that a small amount of water be added during condensation so as to promote an increase in the viscosity. Among the aforementioned methods, the method in which condensation reaction is performed in the emulsion micelles after emulsification of diorganopolysiloxane is preferred, as it allows use of diorganopolysiloxane with a lower viscosity as the starting material. Also, the amount of water used in emulsification should be appropriate to ensure a proportion of diorganopolysiloxane in the range of 40–90 wt %, preferably in the range of 50–70 wt % based on the weight of the emulsion.

There is no special limitation on the type of the emulsifying agent that can be used in the mold release agent of this invention. Examples of the emulsifiers that can be used include nonionic surfactants, anionic surfactants, and cationic surfactants. Examples of the nonionic surfactants include polyoxyalkylene alkyl ethers, polyoxyalkylene alkyl phenyl ethers, polyoxyalkylene alkyl esters, polyoxyalkylene sorbitan alkyl esters, sorbitan alkyl esters, polyethylene glycol, and polypropylene glycol. Examples of the anionic surfactants include sodium salt, potassium salt, and ammonium salt of octylbenzenesulfonic acid, dodecylbenzenesulfonic acid, and other alkylbenzenesulfonic acids; higher alkyl sulfuric acid; polyoxyethylene alkyl ether sulfuric acid; alkylnaphthylsulfonic acid. Examples of the cationic surfactants include octyltrimethylammonium hydroxide, dodecyltrimethylammonium hydroxide, hexadecyltrimethylammonium hydroxide, octyldimethylbenzylammonium hydroxide, decyldimethylammonium hydroxide, didodecyldimethyammonium hydroxide, tallow trimethylammonium hydroxide, coconut oil trimethylammonium hydroxide, and other quaternary ammonium hydroxides and their salts. Usually, the nonionic surfactant may be used alone, the nonionic surfactant and anionic surfactant may be used together, or the nonionic surfactant and cationic surfactant may be used together. The amount of the emulsifier used with respect to 100 parts by weight of diorganopolysiloxane represented by the general formula (1) is in the range of 3–20 parts by weight, preferably in the range of 6–10 parts by weight.

According to this invention, when the diorganopolysiloxane represented by the general formula (1) is subjected to a condensation reaction, it is possible to use an organometallic catalyst for condensation or an acidic substance or an alkaline substance as an ingredient that can promote the reaction and can cause crosslinking to realize a high viscosity in a short time. Among them, the organometallic catalyst for condensation is preferred. These ingredients may be added before emulsification of the diorganopolysiloxane or after emulsification. When the organometallic catalyst for condensation or water-insoluble acidic substance is added after emulsification, it is possible to emulsify it beforehand and then add it in the form of an emulsion.

The conventional organometallic compounds used as catalysts for condensation of silanol groups may be used. Examples include zinc stearate, zinc oleate, dibutyltin dioleate, dibutyltin dilaurate, and zirconium stearate. The amount of the organometallic catalyst with respect to 100 parts by weight of the aforementioned diorganopolysiloxane is preferably in the range of 0.001–2.0 parts by weight.

Examples of acidic substances include formic acid, acetic acid, and propionic acid. Examples of alkaline substances include sodium carbonate, triethanolamine, potassium hydroxide, and sodium hydroxide. The amount of these substances added with respect to 100 parts by weight of the aforementioned diorganopolysiloxane is preferably in the range of 0.1–5 parts by weight.

The mold release agent of this invention is a water-based emulsion containing diorganopolysiloxanes represented by the general formula (1) as the principal ingredient. As long as the purpose of this invention is not hindered, it also can contain the conventional adjuvants for silicone water-based emulsions, such as preservatives, fungicides, rust preventives, coloring agents, mineral oils, higher fatty acids, thickeners, aluminum powder, graphite, and similar materials.

A method for applying the mold release agent of this invention on various substrates is one in which the mold release agent of this invention may be uniformly sprayed by a spray gun or coated by cloth, paper, or brush impregnated with the agent, followed by evaporation of the water content by heating or standing at room temperature.

The mold release agent of this invention does not easily flow and drip downwardly from the substrates on which it is coated. For example, when the mold release agent of this invention is applied on a mold, good mold release properties can be realized for the inner side of the mold. Also, it forms a mold release film with excellent paintability. Consequently, the molding formed can be coated or printed with an organic paint or ink. Consequently, the mold release agent of this invention is very useful as a mold release agent for plastic moldings, aluminum die casts, and the like.

EXAMPLES

In the following, this invention will be explained in more detail with reference to application examples. In the application examples, parts refers to parts by weight and % refers to wt %. The viscosity refers to the value measured at 25° C. Also, for the silicone water-based emulsion mold release agent, the extraction viscosity of organopolysiloxane, the paintability of the mold release agent, the shelf stability, the adhesion on steel sheet, and the mold release properties were measured using the following methods.

Extraction Viscosity of the Organopolysiloxane

One hundred gm of isopropyl alcohol were added to 100 g of the silicone water-based emulsion mold release agent to destroy the emulsion, followed by separation of the water and oil layers. After the oil layer sat for 30 min in a hot-air-circulating oven at 150° C., the viscosity was measured using an E-type rotary viscometer.

Paintability

After the silicone water-based emulsion mold release agent was diluted by water fifty-fold. The diluted mold release agent was uniformly sprayed on a piece of clay-coated paper, with a silicone coating amount of about 0.3 g/m2, by means of a simple spray gun, followed by drying at room temperature. After drying, equally spaced lines were drawn by a felt pen for drawing fat lines of oil-base paint, and the degree of blurring of the lines was assessed as follows:

O: There was no blurring of the lines at all, and the ink was attached uniformly.

D: Lines were partially blurred, and the ink was attached nonuniformly.

X: The lines were significantly blurred, and little ink was attached.

Shelf Stability

One hundred eighty ml of the silicone water-based emulsion mold release agent were loaded in a 200 ml glass bottle, which was then allowed to sit at 25° C. for 3 months. The appearance was then observed.

Adhesion on Steel Sheet

One gm of the silicone water-based emulsion mold release agent was placed in the middle of a steel sheet (SPCC-SB) defined in JIS G 3141, and the water content was evaporated at 150° C. for 30 min. After evaporation, the amount of silicone attached was measured using a chemical balance (attachment amount 1). Then, after the steel sheet was hung for 15 min at room temperature (20° C.) with the surface having the mold release agent applied on it in the vertical direction, the amount of the silicone attached was measured in the same way (attachment amount 2). Also, after the silicone attachment amount was measured (attachment amount 1) right after evaporation of the water content, the steel sheet, with its silicone attached surface in the vertical direction, sat for 5 min in a hot-air-circulating oven at 150° C., followed by measurement of the silicone attachment amount in the same way (attachment amount 3). From these attachment amounts, the silicone attachment rate (%) was calculated using the following formulas:

$$\text{Silicone attachment rate (\%)/20° C.} = \frac{\text{attachment amount 2}}{\text{attachment amount 1}} \times 100$$

$$\text{Silicone attachment rate (\%)/150° C.} = \frac{\text{attachment amount 3}}{\text{attachment amount 1}} \times 100$$

Mold Release Property

The silicone water-based emulsion mold release agent was diluted by water to a silicone concentration of 4%, and the diluted mold release agent was sprayed by a simple spray gun on a mold with an inner area of 5 cm×5 cm and depth of 5 mm, with several corrugated grooves on its bottom, with a silicone coating rate of about 2 g/m2, followed by drying at room temperature. Then, with the mold release-agent-coated surface in the vertical direction, the mold was erected and was preheated at about 250° C. After the mold was preheated, aluminum melted in an electric furnace at about 750° C. was poured into the mold. After cooling, the aluminum plate was peeled from the mold. The ease of peeling was used to assess the mold release property in this case.

■ mold release property is excellent.
○ The mold release property is good.
δ The mold release property is fair.
X The mold release property is poor.

Application Example 1

Fifty parts of diorganopolysiloxane represented by the formula:

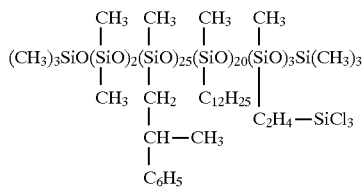

and with a viscosity of 1,400 Cst at 25°, 4 parts of polyoxyethylene (6 mol) lauryl ether, and 0.5 part of sodium lauryl sulfate were loaded into a glass container, and the mixture was blended and dispersed homogeneously by a stirrer. Then, 4 parts of water were added and the mixture was stirred. Then, the mixture was emulsified by a colloid mill, followed by adding 41.5 parts of water to form a silicone water-based emulsion. The emulsion sat at room temperature for 3 months to form a silicone water-based emulsion mold release agent. For the mold release agent, the extraction viscosity of the organosiloxane was measured, and was found to be 8,300 Cp. Also, measurement was performed for the paintability, shelf stability, adhesion on steel sheet, and mold release properties. The results are listed in Table I. The overall rating on the mold release agent is also listed.

Application Example 2

Fifty parts of diorganopolysiloxane represented by the following formula

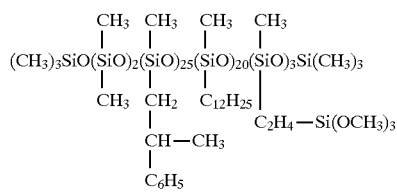

and with a viscosity of 1,450 Cst at 25°, 4 parts of polyoxyethylene (6 mol) lauryl ether, and 0.5 part of sodium lauryl sulfate were loaded into a glass container, and the mixture was blended and dispersed homogeneously by a stirrer. Then, 4 parts of water were added and the mixture was stirred. Then, the mixture was emulsified by colloid mill, followed by adding 40.5 parts of water and 1.0 part of triethanolamine to form a silicone water-based emulsion. The emulsion sat at room temperature for 3 months to form a silicone water-based emulsion mold release agent. The organosiloxane extracted from the mold release agent was gummy. Also, measurement was performed for the paintability, shelf stability, adhesion on steel sheet, and mold release properties. The results are listed in Table I. The overall rating on the mold release agent is also listed.

Application Example 3

Into 50 parts of diorganopolysiloxane represented by the formula

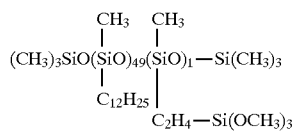

and with a viscosity of 1,270 Cst, 4 parts of polyoxyethylene (6 mol) lauryl ether and 0.5 part of sodium dodecylbenzenesulfonate were added, and the mixture was stirred homogeneously by a stirrer. Then, 5 parts of water were added and the mixture was stirred. Then, the mixture was emulsified by a colloid mill, followed by adding 40.5 parts of water to form a silicone water-based emulsion. The emulsion was mixed with 0.1 part of an emulsion prepared from 50 parts of dioctyltindilaurate, 3 parts of sodium, polyoxyethylene (4 mol) octylphenyl ether sulfate and 47 parts of water. After the mixture was stirred, it sat at room temperature for 7 days to form a silicone water-based emulsion mold release agent. The organosiloxane extracted from the mold release agent was gummy. Also, measurement was performed for the paintability, shelf stability, adhesion on steel sheet, and mold release properties. The results are listed in Table I. The overall rating on the mold release agent is also listed.

Application Example 4

Into 50 parts of diorganopolysiloxane represented by the average formula

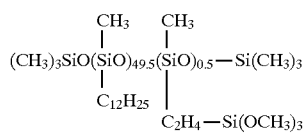

and with a viscosity of 1,120 Cst at 25°, 4 parts of polyoxyethylene (6 mol) lauryl ether and 0.5 part of sodium dodecylbenzenesulfonate were added, and the mixture was stirred homogeneously by a stirrer. Then, 5 parts of water were added and the mixture was stirred. Then, the mixture was emulsified by a colloid mill, followed by adding 40.5 parts of water to form a silicone water-based emulsion. The emulsion was mixed with 0.1 part of an emulsion prepared from 50 parts of dioctyltindilaurate, 3 parts of sodium poyoxyethylene (4 mol) octylphenyl ether sulfate and 47 parts of water. After the mixture was stirred, it sat at room temperature for 7 days to form a silicone water-based emulsion mold release agent. The organosiloxane extracted from the mold release agent was gummy. Also, measurement was performed for the paintability, shelf stability, adhesion on steel sheet, and mold release property. The results are listed in Table I. The overall rating on the mold release agent is also listed.

Application Example 5

Into 50 parts of diorganopolysiloxane represented by the following formula

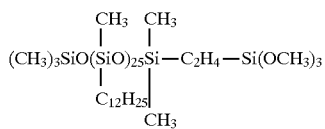

and with a viscosity of 510 Cst, 4 parts of polyoxyethylene (6 mol) lauryl ether and 0.5 part of sodium dodecylbenzenesulfonate were added, and the mixture was stirred homogeneously by a stirrer. Then, 5 parts of water were added and the mixture was stirred. Then, the mixture was emulsified by a colloid mill, followed by adding 40.5 parts of water to form a silicone water-based emulsion. The emulsion was mixed with 0.1 part of an emulsion prepared from 50 parts of dioctyltindilaurate, 3 parts of sodium polyoxyethylene (4 mol) octylphenyl ether sulfate and 47 parts of water. After the mixture was stirred, it sat at room temperature for 7 days to form a silicone water-based emulsion mold release agent. For the organosiloxane in the mold release agent, the extraction viscosity was measured, and was found to be 3,420 Cst. Also, measurement was performed for the paintability, shelf stability, adhesion on steel sheet, and mold release properties. The results are listed in Table I. The overall rating on the mold release agent is also listed.

Comparative Example 1

A silicone water-based emulsion mold release agent was prepared in the same way as in Application Example 1, except that in place of the diorganopolysiloxane with viscosity of 1,400 Cst used in Application Example 1, a diorganopolysiloxane represented by the formula

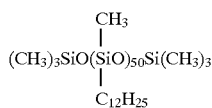

and with a viscosity of 860 Cst was used. For the organosiloxane in the obtained mold release agent, the extraction viscosity was measured and found to be 860 Cst. Also, measurement was performed for the paintability, shelf stability, adhesion on steel sheet, and mold release properties. The results are listed in Table I. The overall rating on the mold release agent is also listed.

Comparative Example 2

A silicone water-based emulsion mold release agent was prepared in the same way as in Application Example 3, except that in place of the diorganopolysiloxane with viscosity of 1,270 Cst used in Application Example 3, a diorganopolysiloxane represented by the following formula

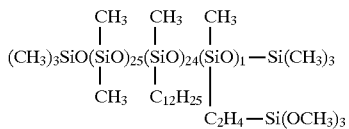

and with viscosity of 610 Cst was used. The organosiloxane extracted from the mold release agent was gummy. Also, measurement was performed for the paintability, shelf stability, adhesion on steel sheet, and mold release properties. The results are listed in Table I. The overall rating on the mold release agent is also listed.

Comparative Example 3

A silicone water-based emulsion mold release agent was prepared in the same way as in Application Example 3, except that in place of the diorganopolysiloxane with viscosity of 1,270 Cst used in Application Example 3, a diorganopolysiloxane represented by the formula

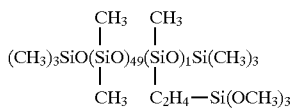

and with a viscosity of 120 Cst was used. The organosiloxane extracted from the mold release agent was gummy. Also, measurement was performed for the paintability, shelf stability, adhesion on steel sheet, and mold release properties. The results are listed in Table I. The overall rating on the mold release agent is also listed.

Comparative Example 4

An aqueous solution prepared from 0.5 part of dodecylbenzenesulfonic acid and 64.5 parts of water was added to 35 parts of dimethylcyclosiloxane (with a degree of polymerization of 4–6), and the mixture was stirred. Then, emulsification was performed twice under a pressure of 350 kg/cm2 by using homogenizing emulsifying equipment. After the silicone water-based emulsion sat at 50° C. for 24 hr., it was neutralized by adding sodium carbonate to a pH of 7.5, forming a silicone water-based emulsion mold release agent. The extraction viscosity of the organopolysiloxane in the mold release agent was measured and was found to be 11,000 Cp. Also, measurement was performed for the paintability, shelf stability, adhesion on steel sheet, and mold release properties. The results are listed in Table I. The overall rating on the mold release agent is also listed.

TABLE I

| | | Adhes Stab. | | | |
| | | | | | |
| Apps Examp. | Paint | Shelf Stab. | Attach Rate (%, 20° C.) | Attach Rate (%, 150° C.) | Mold Rel. | Overall Rating |
|---|---|---|---|---|---|---|
| 1 | ○ | no sep. | 85 | 56 | ■-○ | Good |
| 2 | ○ | no sep. | 100 | 99 | ■ | Good |
| 3 | ○ | no sep. | 100 | 100 | ■ | Good |

TABLE I-continued

|  | Paint | Shelf Stab. | Adhes Stab. Attach Rate (%, 20° C.) | Attach Rate (%, 150° C.) | Mold Rel. | Overall Rating |
|---|---|---|---|---|---|---|
| 4 | ○ | no sep. | 100 | 97 | ■ | Good |
| 5 | ○ | no sep. | 58 | 37 | ■-○ | Good |
| Comp. Examp. | | | | | | |
| 1 | ○ | no sep. | 29 | 17 | δ-X | Insufficient |
| 2 | δ-X | no sep. | 100 | 98 | ■ | " |
| 3 | X | no sep. | 100 | 100 | ■ | " |
| 4 | X | no sep. | 100 | 98 | ■ | " |

Apps Examp. = application example; comp. examp, = comparative example; paint. = paintability; shelf stab. = shelf stability; adhes. stab. = adhesion on steel sheet; attach rate = attachment rate; mold rel. = mold-release property The mold release agent of this invention is a water-based emulsion with the condensation reaction product of the diorganopolysiloxane represented by the general formula (1) as the principal ingredient. Consequently, it can form a mold release film with excellent paintability, and after it is coated on various substrates, it does not easily flow and drip downward. Also, the manufacturing method of this invention is characterized by the fact that the mold release agent can be manufactured at a high efficiency.

What is claimed is:

1. A silicone water-based emulsion mold release agent characterized by the fact that its principal ingredient is the condensation reaction product of a diorganopolysiloxane represented by following general formula (1):

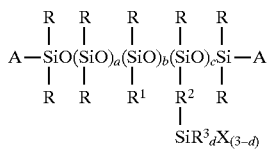

$$A-SiO(SiO)_a(SiO)_b(SiO)_cSi-A \quad (1)$$

with R substituents, R$^1$, R$^2$, and $SiR^3_dX_{(3-d)}$ in which R represents a $C_{1-7}$ monovalent hydrocarbon group; R$^1$ represents a $C_8$ or higher monovalent hydrocarbon group; R$^2$ represents a divalent hydrocarbon group; R$^3$ represents a monovalent hydrocarbon group or hydroxyl group; X represents a hydrolyzable group; A represents a group selected from R, R$^1$, or the group represented by the formula

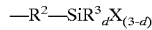

$$-R^2-SiR^3_dX_{(3-d)}$$

in which R$^2$, R$^3$ and X have the same meanings as above and d is 0, 1, or 2 with the proviso that when c is 0, at least one A is the group represented by the formula

$$-R^2-SiR^3_dX_{(3-d)};$$

a is 0 or a positive integer; b is a positive integer; c is 0 or a positive number; and a/(a+b+c)=0 to 0.2, and c/(a+b+c)=0 to 0.2, and d has value of 0, 1, or 2.

2. The silicone water-based emulsion mold release agent as claimed in claim 1, characterized by the fact that the viscosity of the condensation reaction product of the diorganopolysiloxane represented by general formula (1) at 25° C. is 2,000 Cst or higher.

3. The silicone water-based emulsion mold release agent as claimed in claim 1, characterized in that the condensation reaction product is formed in a condensation reaction of a diorganopolysiloxane represented by general formula (1) in the presence of an organometallic condensation catalyst.

4. A manufacturing method for the silicone water-based emulsion mold release agent as claimed in claim 1, characterized by the fact that the condensation reaction is performed after mixing a diorganopolysiloxane represented by general formula (1), with emulsification, in water.

5. A manufacturing method for the silicone water-based emulsion mold release agent as claimed in claim 1, characterized by the fact that emulsion is formed while the condensation reaction is carried out in water using the diorganopolysiloxane represented by general formula (1).

* * * * *